E. G. BUDD.
WIRE SPOKED WHEEL.
APPLICATION FILED FEB. 13, 1918.
1,388,021.
Patented Aug. 16, 1921.
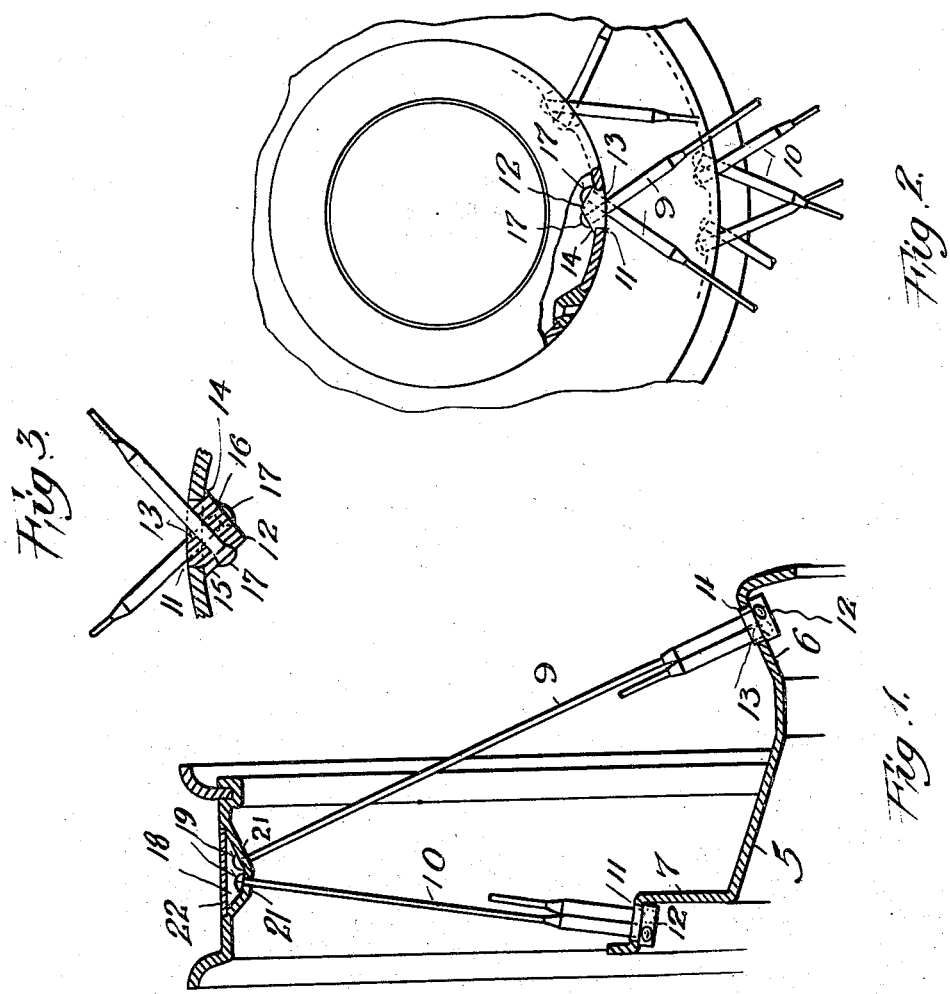

UNITED STATES PATENT OFFICE.

EDWARD G. BUDD, OF PHILADELPHIA, PENNSYLVANIA, ASSIGNOR TO BUDD WHEEL CORPORATION, OF PHILADELPHIA, PENNSYLVANIA, A CORPORATION OF VIRGINIA.

WIRE-SPOKED WHEEL.

1,388,021. Specification of Letters Patent. Patented Aug. 16, 1921.

Original application filed July 19, 1916, Serial No. 110,112. Divided and this application filed February 13, 1918. Serial No. 217,013.

*To all whom it may concern:*

Be it known that I, EDWARD G. BUDD, a citizen of the United States, residing at Philadelphia, in the county of Philadelphia, State of Pennsylvania, have made a certain new and useful Invention in Wire-Spoked Wheels, of which the following is a specification.

This invention relates to wire spoked wheels, and embodies subject matter divided from my application, No. 110,112, filed July 19, 1916.

The object of the invention is to provide a structure of wire spoked wheels wherein means are afforded for a straight-away connection of the wire spokes between the wheel hub and the rim.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Referring to the drawing:—

Figure 1 is a view in central longitudinal section of a wire spoked wheel structure embodying the principles of my invention.

Fig. 2 is a view in end elevation of the same, parts broken out and parts in section, to show a wheel hub connection of the spokes in accordance with the principles of my invention.

Fig. 3 is a broken detail view in section showing the means for securing the ends of the spokes to the wheel hub.

The same part is designated by the same reference numeral wherever it occurs throughout the several views.

In the construction of wire spoked wheels it is usual and desirable to employ sets of wire spokes to connect the hub and rim of the wheel, and which spokes are inclined to the central plane of the wheel and are also tangential to the hub.

In order to secure the proper inclination of the spokes it has been the usual custom, particularly in the case of spokes which are connected tangentially to the hub, to bend the spokes at their ends where they pass through and are anchored to the hub sleeve of the wheel. The same practice has heretofore ordinarily been followed in connecting the ends of the inclined spokes to the rim, the spokes being bent at their ends to permit a radial connection of the spoke to the rim. In either case a more or less radial connection of the spoke ends to the hub and rim respectively is secured while the main bodies of the spokes are inclined from the hub toward the rim and to the central plane of the wheel. This arrangement is undesirable and objectionable because of the resulting danger of spokes becoming ruptured or broken at the points where they are bent under the influence of the strains to which the spokes are subjected when the wheel is in use. It is among the special purposes of my present invention to provide for the inclined relation of the spokes above referred to, all spokes being tangential to the hub, and at the same time avoiding any bends throughout the length of the spokes. In other words, it is my purpose to provide a structure of connection of the spoke ends to the hub and to the rim respectively which permits the use of straight spokes from end to end while still disposed in inclined relation to the central vertical plane of the wheel rim, and while being connected tangentially to the hub sleeve, and in addition, it is my object to provide in such a structure a means for efficiently anchoring the hub ends.

Referring to the drawing: 5 designates the wheel hub sleeve of a wire spoked wheel. This sleeve in the form shown is generally cone shaped with its outer end portion 6 outwardly flared or reversely tapered with respect to the taper of the body of the sleeve, and having a radial flange 7 at its inner end terminating in an outwardly flared or inclined portion 8. The hub ends of the outer spokes 9 are anchored in the reversely inclined or outwardly flared end portion 6 of the sleeve 5, while the hub ends of the inner spokes 10 are anchored in the inclined flared inner end 8 of the sleeve. In practice it is desirable that the spokes 9, 10, be inclined at an angle to the central plane of the wheel rim and also that they be connected tangentially to the hub, that is, in inclined relation to the chord, which subtends the arc of that portion of the periphery of the hub sleeve through which the spokes pass. To permit the employment of this inclined position of the spokes, and at the same time to afford a straight-away lead of the spokes from end to end without bending them at any point, and particularly at their points of connection to the hub sleeve, I form the portions 6 and 8 at the outer and inner ends of the hub sleeve with perforations 11. In these perforations are seated shouldered blocks 12 each having a central portion 13 which projects into the perforation 11 from the interior of the hub sleeve. The central portion 13 of the block is bounded by a shoulder portion 14, which shoulder takes bearing against the inner surface of the hub sleeve, or that portion thereof which surrounds the opening 11 therethrough. The hub ends of the spokes pass straight-away through perforations formed in the blocks 12. The inner surface of the block 12 is provided with surfaces 15, 16, which are inclined to each other. The perforations which receive the spoke ends are formed through the block 12 and extend from the inclined surfaces 15, 16, in oppositely inclined relation to each other and in offset or staggered relation with respect to each other, and through the body of the block and the central extension 13 thereof. These perforations are countersunk or enlarged at the inclined surfaces 15, 16, of the block to receive the rounded heads or bolts 17 on the ends of the spokes. The spokes are arranged in pairs, the members of which are inclined in opposite directions with respect to each other.

The structure above described affords a very simple and efficient anchorage connection for the hub ends of each pair of spokes, each anchorage block 12 receiving the hub ends of a pair of spokes. The structure described also affords a simple and effective means for securing and anchoring the hub ends of the spokes of each pair without interfering with the tangential relation of the spokes to the hubs, and without requiring any bending of the spokes to effect their anchorage to the hub sleeve. It will be observed that the longitudinal tension of the spokes tend to efficiently hold the anchor blocks 12 into its shouldered and seated relation to the wheel hub sleeve.

It will be understood that the same structure is employed for securing the spoke ends to the hub sleeve at each end of said sleeve. The other, or rim ends, of the spokes, may be secured, attached and anchored in any suitable, convenient or desired manner to the rim. As illustrative of one form of connection of the rim ends of the spokes I have shown a centrally depressed channel 18 formed in the rim, the spoke ends passing through the rim, and the heads 19 thereof being seated in countersunk seats formed in said channel. In order to coöperate with the anchorage of the hub sleeve ends of the spokes in effecting a straight-away lead of the spokes from end to end without bends, the centrally depressed channel 18 in the rim is formed with wall portions 20, 21, disposed in angular relation with respect to each other and through which, respectively, the two sets of spokes 9, 10, extend, said wall portions 20, 21, respectively, being disposed at substantially right angles to the length of said respective sets of spokes. This formation of the channel wall portions of the rim in coöperation with the anchor blocks 12 permits the use of the inclined and tangentially disposed spokes to be employed without bends therein. In order to present a smooth seating surface for the tire in the rim a ring or band 22 is positioned in the rim as a cover for the channel 18. The band 22 is seated in a groove in the seating surface of the rim and lies flush with the exterior of the seating surface of the rim. This arrangement avoids the necessity of grinding off the ends of the spokes after the wheel is assembled, and the spokes tensioned, thereby reducing the cost of manufacture of the structure.

Having now set forth the object and nature of my invention, and a structure embodying the principles thereof, I wish it to be understood that many changes in the specific details of structure might readily occur to persons skilled in the art and still fall within the spirit and scope of my invention.

What I claim as new and useful and of my own invention, and desire to secure by Letters Patent, is:—

1. In a structure of the class described, the combination with a hub shell and a rim, said hub shell having a plurality of spaced openings therein, of a plurality of anchor blocks, each engaging the inner surface of the hub shell and having a central reduced portion disposed in one of said openings and a straight passage way therethrough with one end thereof opening inside said hub shell, and a plurality of straight spokes each having one end disposed in one of said passageways and the other end connected to said rim.

2. In a structure of the class described, the combination with a hub shell and a rim, said hub shell having a plurality of spaced openings therein, of a plurality of anchor blocks, each disposed within the hub shell and having a shoulder engaging the inner surface of the hub shell, a central reduced portion disposed in one of said openings, and a pair of inner faces inclined at an angle to each other, there being a pair of straight pasageways through each block, one at substantially right angles to each face, and a plurality of straight spokes each having one end disposed in one of said passageways and the other end connected to said rim.

In testimony whereof I have hereunto set my hand on this 9th day of February A. D., 1918.

EDWARD G. BUDD.